United States Patent [19]

Kimimura et al.

[11] Patent Number: 4,647,504
[45] Date of Patent: Mar. 3, 1987

[54] DISPERSION OF SOLVENT-SUSPENDIBLE PRESSURE SENSITIVE ADHESIVE PARTICLES AND PRESSURE SENSITIVE ADHESIVE SHEET UTILIZING THE PROPERTIES OF THE DISPERSION

[75] Inventors: Kyomi Kimimura, Higashikurume; Wataru Shimokawa, Hachioji; Toshibumi Igarashi, Mitaka, all of Japan

[73] Assignee: Hoechst Gosei Kabushiki Kaisha, Tokyo, Japan

[21] Appl. No.: 809,972

[22] Filed: Dec. 17, 1985

[30] Foreign Application Priority Data

Dec. 22, 1984 [JP] Japan .................. 59-271306
Jun. 7, 1985 [JP] Japan .................. 60-124650

[51] Int. Cl.$^4$ ............... C08L 25/08; C08L 33/06; C08L 39/04; C09J 7/02
[52] U.S. Cl. .................... 428/327; 428/402; 526/271; 526/273
[58] Field of Search ............... 428/327, 402; 526/271, 526/273

[56] References Cited

U.S. PATENT DOCUMENTS

| | | | |
|---|---|---|---|
| 3,691,140 | 9/1972 | Silver | 526/240 |
| 3,857,731 | 12/1974 | Merrill, Jr. et al. | 428/314.4 |
| 3,998,997 | 12/1976 | Mowdood et al. | 526/271 |
| 4,166,152 | 8/1979 | Baker et al. | 428/522 |

*Primary Examiner*—William J. Van Balen
*Attorney, Agent, or Firm*—Armstrong, Nikaido, Marmelstein & Kubovcik

[57] ABSTRACT

A dispersion of solvent-suspendible pressure sensitive adhesive particles, which comprises (A) pressure sensitive adhesive particles comprising an internally crosslinked copolymer and having a particle size of 5 to 200 microns and an organic solvent; the copolymer being prepared by copolymerizing (a) 2 to 10% by weight of at least one member selected from the group consisting of methyl acrylate, styrene and a methacrylate of alcohol having 1 to 5 carbon atoms, (b) 98 to 90% by weight of at least one member selected from the group consisting of a acrylate of alcohol having 2 to 12 carbon atoms and a methacrylate of alcohol having 6 to 12 carbon atoms;

(c) 0.1 to 2.0% by weight of maleic anhydride, and (d) 0.05 to 1.0% by weight of at least one member selected from the group consisting of tetraallyloxyethane, triallyl cyanurate and triallyl isocyanurate and a dispersion of solvent-suspendible pressure sensitive adhesive particles prepared by dispersing 2 to 20 parts by weight (as sold matter) of a styrene-containing polymer having a styrene content of 5 to 70% by weight and having a particles size of 0.02 to 3 microns in a 100 parts by weight of the above dispersion, and the pressure sensitive adhesive sheet utilizing the above mentioned dispersions. The pressure sensitive adhesive sheet can be repeatedly adhered and removed. Moreover the pressure sensitive adhesive sheet does not cause the paper-tearing phenomenon nor the adhesive migration phenomenon in case the styrene containing emulsion is employed as a binder.

6 Claims, No Drawings

DISPERSION OF SOLVENT-SUSPENDIBLE PRESSURE SENSITIVE ADHESIVE PARTICLES AND PRESSURE SENSITIVE ADHESIVE SHEET UTILIZING THE PROPERTIES OF THE DISPERSION

BACKGROUND OF THE INVENTION

The present invention relates to a dispersion of solvent-suspendible pressure sensitive adhesive particles and a pressure sensitive adhesive sheet utilizing the properties of the dispersion, and more particularly, to a dispersion of solvent-suspendible pressure sensitive adhesive particles which are hard to swell in solvents and have excellent adhesion and a pressure sensitive adhesive sheet produced by employing the dispersion, wherein when the pressure sensitive adhesive sheet of the present invention is removed from an adherend, the paper-tearing phenomenon that the surface materials of adherend is picked up by the adhesive sheet hardly occurs.

The present invention also relates to a dispersion of solvent-suspendible pressure sensitive adhesive particles prepared by dispersing pressure sensitive adhesive particles, which is hard to swell in solvents and has excellent adhesion, and binders filling the spaces between the particles, wherein the adhesive particles transfer phenomenon that the pressure sensitive adhesive are transfered to the adherend as well as the above-mentioned paper-tearing phenomenon hardly occur.

Recently, there have come on the market office supplies prepared by placing pressure sensitive adhesive particles on a sheet material such as paper, which can be repeatedly adhered and removed, that is, the adhesive face of the sheet is adhered to and removed from the adherend, and it is again adhered to and removed from the adherend.

The above mentioned pressure sensitive adhesive sheet utilizes the property of pressure sensitive adhesive particles having a particle size of several microns to a few hundreds microns. That is, when the adhesive face of the pressure sensitive adhesive sheet is adhered to an adherend, the adhesive contact is made on innumerable points, since pressure sensitive adhesive particles are placed on the sheet like cupules of octopus. When the sheet is removed from the adherend, the surface materials of the adherend is not picked up since the sheet is adhered to the adherend on points, each point the adhesive being very small in area. The pressure sensitive adhesive sheet can be again adhered to the adherend since pressure sensitive adhesive particles are still exposed retaining their original properties. Such a pressure sensitive adhesive sheet that can be repeatedly adhered and removed can be prepared by coating a dispersion of pressure sensitive particles on the surface thereof. In that case, it is preferable that pressure sensitive adhesive particles having an average particle size of several microns to several hundreds microns are densely placed on the surface of the paper.

Further, it is preferable that the shape of the pressure sensitive adhesive particle is truly spherical. If the particles are crushed like a Rugby ball, the particles are adhered to the sheet in a plane. Therefore, the paper-tearing phenomenon occurs because of strong adhesion.

Still further, it is preferable that the distribution range of particle size is as narrow as possible. When the distribution range is broad, the adhesion of the pressure sensitive adhesive sheet is poor and accordingly such sheet is not practical since only those particles having a large particle size contact the adherend.

This kind of pressure sensitive adhesive particles, which is well known hitherto, is prepared by the suspension polymerization of acrylic monomer in water using an oil soluble polymerization initiator. It is not problem in case that thus obtained aqueous suspension of pressure sensitive adhesive particles is coated on a non-water-absorbing substrate sheet, but when the aqueous suspension is directly coated on a paper, the paper curls owing to water and accordingly the commercial value of the pressure sensitive adhesive sheet remakably lowers. In general, therefore, as a solvent, an organic solvent such as toluene, ethyl acetate or 1,1,1-trichloroethane is employed instead of water. Moreover, the advantages that the drying time is short and the mechanical stability is excellent are obtained by employing the organic solvent.

However, in conventional pressure sensitive adhesive particles, the particles swell in the solvent more or less and tend to adhere to form a film even in case of using a poor solvent having little affinity. Therefore, such pressure sensitive adhesive particles have a drawback in readhesion since the separation between paper layers occurs because of the adhesion in a plane between the paper and the adherend.

SUMMARY OF THE INVENTION

In order to solve the conventional drawbacks, it has been studied that the pressure sensitive adhesive particles are internally cross-linked so as to hardly swell in a solvent and have suitable adhesion. However, the adhesion of the pressure sensitive adhesive particles becomes poor or the prevention of the swelling of particles is unsatisfactory by merely employing a cross-linking agent.

The present invention relates to a dispersion of solvent-suspendible pressure sensitive adhesive particles prepared by copolymerizing the specific internally cross-linkable monomer with acrylic monomer and a dispersion of solvent-suspendible pressure sensitive adhesive particles prepared by dispersing a styrene-containing polymer having a desired particle size in a desired amount in the above dispersion.

The present invention further relates to a pressure sensitive adhesive sheet prepared by coating the above dispersion of solvent-suspendible pressure sensitive adhesive particles on a substrate sheet, and a pressure senditive adhesive sheet made in the same way in which the spaces between the particles are filled by styrene-containing polymer.

The present invention still further relates to a pressure sensitive adhesive sheet prepared by coating the above dispersion of solvent-suspendible pressure sensitive adhesive particles on a substrate having an anchor coat layer coated on the surface thereof, and a pressure sensitive adhesive sheet having an anchor coat layer in which the spaces between the particles are filled by styrene-containing polymer.

These and other effects of the present invention will become apparent from the description hereinafter.

DETAILED DESCRIPTION

In accordance with the present invention, there are provided a dispersion of solvent-suspendible pressure sensitive adhesive particles, which comprises (A) pressure sensitive adhesive particles comprising an internally cross-linked copolymer and having a particle size of 5 to 200 microns and an organic solvent; the copolymer being prepared by copolymerizing (a) 2 to 10% by weight of at least one member selected from the group consisting of methyl acrylate, styrene and a methacrylate of alcohol having 1 to 5 carbon atoms, (b) 98 to 90% by weight of at least one member selected from the group consisting of an acrylate of alcohol having 2 to 12 carbon atoms and a methacrylate of alcohol having 6 to 12 carbon atoms, (c) 0.1 to 2.0% by weight of maleic anhydride, and (d) 0.05 to 1.0% by weight of at least one member selected from the group consisting of tetraallyloxyethane, triallyl cyanurate and triallyl isocyanurate; a pressure sensitive adhesive sheet prepared by coating the above dispersion on a substrate sheet, thereby placing on the sheet the pressure sensitive adhesive particles comprising an internally cross-linked copolymer and having a particle size of 5 to 200 microns; and a pressure sensitive adhesive sheet prepared by coating the above dispersion on a substrate having an anchor coat layer coated on the surface thereof, thereby placing on the sheet the pressure sensitive adhesive particles comprising an internally cross-linked copolymer and having a particle size of 5 to 200 microns.

In accordance with the present invention, there are also provided a dispersion of solvent-suspendible pressure sensitive adhesive particles, which comprises (A) 100 parts by weight of pressure sensitive adhesive particles compsiring an internally cross-linked copolymer and having a particle size of 5 to 200 microns, (B) 2 to 20 parts by weight (as solid matter) of a binder for the pressure sensitive adhesive particles, which is a styrene-containing polymer having a styrene content of 5 to 70% by weight and having a particle size of 0.02 to 3 microns, and an organic solvent; the copolymer being prepared by copolymerizing (a) 2 to 10% by weight of at least one member selected from the group consisting of methyl acrylate, styrene and a metahcrylate of alcohol having 1 to 5 carbon atoms, (b) 98 to 90% by weight of at least one member selected from the group consisting of an acrylate of alcohol having 2 to 12 carbon atoms and a methacrylate of alcohol having 6 to 12 carbon atoms, (c) 0.1 to 2.0% by weight of maleic anhydride, and (d) 0.05 to 1.0% by weight of at least one member selected from the group consisting of tetraallyloxyethane, triallyl cyanurate and triallyl isocyanurate; a pressure sensitive adhesive sheet prepared by coating the above dispersion on a substrate sheet, thereby placing on the sheet the pressure sensitive adhesive particles comprising an internally cross-linked copolymer and having a particle size of 5 to 200 microns; and a pressure sensitive adhesive sheet prepared by coating the above dispersion on a substrate having an anchor coat layer coated on the surface thereof, thereby placing on the sheet the pressure sensitive adhesive particles comprising an internally cross-linked copolymer and having a particle size of 5 to 200 microns.

The dispersion of solvent-suspendible pressure sensitive adhesive particles (1) of the present invention is a dispersion that pressure sensitive adhesive particles having a particle size of 5 to 200 microns, composed of an internally cross-linked copolymer prepared by copolymerizing a monomer mixture having the specific compounds are dispersed into an organic solvent. The particles of the internally cross-linked copolymer prepared by copolymerizing the monomer mixture having the specific components not only have remarkably excellent pressure sensitive adhesion but also can be dispersed into the organic solvent in a true sphere without swelling or dissolvig since the particles are internally cross-linked with a specific cross-linking agent.

Therefore, when the dispersion is coated on a paper, the paper does not curl and the coated paper quickly dries since the dispersion does not contain water.

According to the present invention, there can be obtained the pressure sensitive adhesive sheet on which truly spherical pressure sensitive adhesive particles are densely placed. When the pressure sensitive adhesive sheet of the present invention is adhered to an adherend, the adhesion takes place in points since the particles are truly spherical. Moreover, when the pressure sensitive adhesive sheet is removed, the surface material of the adherend is not picked up together with the pressure sensitive adhesive sheet (that is, paper-tearing phenomenon does not occur) because of the small adhesion area.

In the present invention, the monomer component (A-a) includes at least one member selected from the group consisting of methyl acrylate, styrene and methacrylate of an alcohol having 1 to 5 carbon atoms. The homopolymer of methyl acrylate has a glass transition temperature (hereinafter referred to as "Tg") of 8° C. The homopolymer of styrene has a Tg of 100° C. Examples of the methacrylate of an alcohol having 1 to 5 carbon atoms are, for instance, methyl methacrylate, ethyl methacrylate, propyl methacrylate, butyl methacrylate, pentyl methacrylate, and the like. The homopolymer thereof have Tg of 105° C., 66° C., 35° C., 21° C. and 10° C., respectively. That is, the homopolymers of polymers shown in (A-a) have Tg of 0° to about 100° C.

The monomer component (A-b) used in the invention includes at least one member selected from the group consisting of an acrylate of alcohol having 2 to 12 carbon atoms and a methacrylate of alcohol having 6 to 12 carbon atoms. Examples of the acrylate are, for instance, ethyl acrylate (Tg=−22° C.), butyl acrylate (Tg=−52° C.), 2-ethylhexyl acrylate (Tg=−70° C.), and the like. Examples of the methacrylate are, for instance, hexyl methacrylate, and the like. The homopolymers thereof have Tg of minus several tens of degrees to less than 0° C.

The content of the component (A-a) and component (A-b) are limited from 2 to 10% by weight, from 98 to 90% by weight, respectively in order to give essential pressure sensitive adhesion to the obtained resin. In case that the contents are less than or more than the above-mentioned range, the satisfactorily pressure sensitive adhesive resin cannot be obtained.

Maleic anhydride used as the component (A-c) is employed in the content of 0.1 to 2.0% by weight in order to carry out the polymerization reaction smoothly and thereby obtain a stable suspension.

Tetraallyloxyethane used as the component (A-d) has the formula:

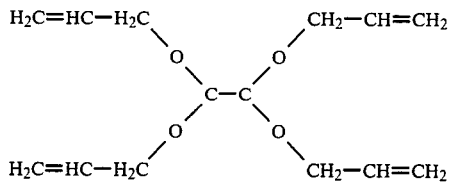

triallyl cyanurate has the formula:

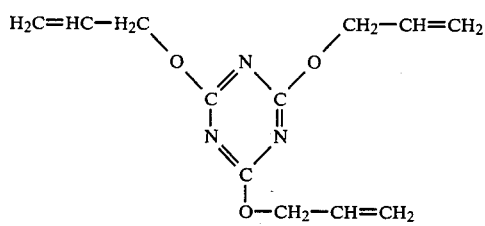

and triallyl isocyanurate has the formula:

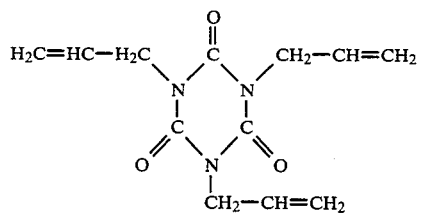

These compounds are internal cross linking agents which have excellent reactivity and are internally cross linked uniformly since, in comparison with usual internal cross-linking agents, the above-mentioned internal cross-linking agents have 3 or 4 polymerizable functional groups. Therefore, the dispersion can be obtained in which the pressure sensitive adhesive particles are quite round and dispersed without losing the pressure sensitive adhesive strength of the obtained resin and swelling and dissolving in the organic solvent.

These internal cross-linking agents can be employed alone or in admixture thereof. It is preferable that the internal cross linking agent is employed in the content of 0.05 to 1.0% by weight. In case that the content is less than 0.05% by weight, the solvent resistance is insufficient because of a little internal cross-linking effect. On the other hand, in case that the content is more than 1% by weight, the pressure sensitive adhesion is low because of the excessive cross-linking.

The copolymer of the present invention may includes other monomers such as N-methylolacrylamide, acrylonitrile, ethylene, vinyl chloride, vinyl acetate and a vinyl ester of branched saturated carboxylic acid having 9 to 11 carbon atoms (commercially available under the commercial name "VeoVa" made by Shell Chemicals) in such an amount that the obtained copolymer does not lose the adhesive property, that is in a range of not more than 10% by weight.

In preparing the dispersion of solvent-suspendable pressure sensitive adhesive particles of the present invention, firstly, an aqueous suspension in which pressure sensitive adhesive particles are suspended is prepared by the conventional suspension polymerization processes empolying monomers (A-a), (A-b), (A-c) and (A-d). Examples of the conventional suspension polymerization processes are, for instance, a polymerization in which a reactor is charged with all monomers at one time and the polymerization is carried out, a polymerization in which monomers are added dropwise, a polymerization in which emulsified monomers are added dropwise, and the like.

As a polymerization initiator, there is employed an oil soluble initiator such as benzoyl peroxide, azobisisobutyronitrile, tert-butyl perbenzoate, cumene hydroperoxide, diisopropylperoxydicarbonate, di-n-propylperoxydicarbonate, di(2-ethoxyethyl)peroxydicarbonate, tert-butyl peroxyneodecanoate, tert-butyl peroxypivalate, di(3,5,5-trimethylhexanoyl)peroxide, dilauroylperoxide, dipropionylperoxide or diacetylperoxide.

As a suspension stabilizer, there is employed a water-soluble polymer such as polyvinyl alcohol, hydroxyethyl cellulose, sodium polyacrylate, polyvinyl pyrrolidone, carboxymethyl cellulose or carboxy-modified polyacryamide.

Moreover, an anionic surface active agent or a nonionic surface active agent can be employed. Particularly, it is preferable that the anionic surface active agent is employed in large quantities in order to prepare a stable aqueous suspension.

The particle size of the pressure sensitive adhesive particle of the present invention can be controlled by, for instance, controlling the stirring condition of the suspension polymerization. The preferable particle size is from 5 to 200 microns.

It is preferable that the distribution range of particle size containing at least 80% of pressure sensitive adhesive particles is about 10 microns when the average particle size is about 5 microns, and about 30 microns when the average particle size is about 200 microns.

Next, the pressure sensitive adhesive particles are sedimented by leaving the aqueous suspension to stand alone, separated by centrifugalizing the aqueous suspension or coagulated by throwing the aqueous suspension in methanol, and taken out. Then, the pressure sensitive adhesive particles are dispersed in an organic solvent such as toluene, ethyl acetate, or 1,1,1-trichloroethane to obtain the dispersion of solvent-suspendable pressure sensitive adhesive particles.

The amount of the organic solvent is not neccesarily limited, but it is preferable that the amount of the organic solvent is from 70 to 95% by weight based on the dispersion. In case that the amount is less than 70% by weight, it is hard to coat the dispersion on the substrate sheet. On the other hand, in case that the amount is more than 95% by weight, the amount of the dispersion or the number of coatings must be increased.

In the present invention, the dispersion of solvent-suspendable pressure sensitive adhesive particles (2) is prepared by adding the styrene-containing polymer to the above-mentioned dispersion (1).

In that case, the sytrene-containing polymer to fill spaces between the pressure sensitive adhesive particles functions as a binder between the particles themselves and between the particles and the substrate sheet, when the pressure sensitive adhesive sheet is prepared by coating the dispersion of solvent-suspendible pressure sensitive adhesive particles (2) on the surface thereof.

The particle size of the styrene-containing polymer is from 0.02 to 3 microns. The particles are dispersed in an organic solvent without dissolving. When the dispersion (2) of the present invention is coated on the substrate sheet, the bond between the pressure sensitive adhesive particles and between the pressure sensitive adhesive particles and the substrate sheet is stronger because the styrene-containing polymer is used as a binder. Therefore, when the pressure sensitive adhesive sheet is removed from the adherend, very few pressure sensitive adhesive particles are transfered to the adherend, in other words, very few pressure sensitive adhesive particles remain on the adherend (adhesive migration phenomenon). Therefore, when the pressure sensitive adhesive sheet is adhered to the adherend having a higher affinity with pressure sensitive particles, that is, having a higher adhesion to pressure sensitive particles and accordingly being more apt to cause the adhesive transfer, the adhesive transfer still does not occur. This is the excellent effect of the binder.

Also, when the pressure sensitive adhesive sheet of the present invention is removed, the paper-tearing phenomenon does not occur since the pressure sensitive adhesive particles are truly spherical and adhere to the adherend in points.

In preparing the dispersion of solvent-suspendible pressure sensitive adhesive particles (2) containing the styrene-containing polymer, the aqueous suspension of pressure sensitive adhesive particles is firstly prepared by employing monomers (A-a), (A-b), (A-c) and (A-d). The aqueous emulstion of styrene-containing polymer having a particle size of 0.02 to 3 microns and styrene content of 5 to 50% by weight is secondly prepared by the conventional emulsion polymerization. Then, 100 parts by weight (as solid matter) of the aqueous suspension of the pressure sensitive adhesive particles and 20 to 2 parts by weight (as solid matter) of the aqueous emulsion of the styrene-containing polymer are mixed and dispersed uniformly. The pressure sensitive adhesive particles in the obtained aqueous dispersion are collected by leaving the aqueous dispersion to stand alone, centrifugalizing it, throwing it in methanol, and the like to take out the aggregate, and the obtained aggregate is dispersed in the organic solvent such as toluene, ethyl acetate or 1,1,1-trichloroethane to give the dispersion (2). In case that, the amount of the styrene-containing polymer is less than 2 parts by weight, the satisfactory bonding effect cannot be obtained. On the other hand, in case that the amount of the styrene-containing polymer is more than 20 parts by weight, the adhesion becomes poor since pressure sensitive adhesive particles are covered with the styrene-containing polymer.

The styrene-containing polymer employed as a binder can be prepared by polymerizing 30 to 95% by weight of a monomer mixture of at least one $\alpha,\beta$ olefine monomer other than styrene, for instance, methacrylate such as methyl methacrylate, acrylate such as methyl acrylate, ethyl acrylate, butyl acrylate, 2-ethylhexyl acrylate or isononyl acrylate, vinyl ester such as vinyl acetate, VeoVa (commercial name, made by Shell Chemicals), ethylene, vinyl chloride, acrylonitrile, butadiene, and the like, and the $\alpha,\beta$ olefine monomer or monomers suitably added with functional or cross-linkable monomers such as $\alpha,\beta$ unsaturated carboxylic acid, acrylamide, N-methylol acrylamide, hydroxyalkyl acrylate, glycidyl methacrylate, divinyl benzene, triallyl isocyanurate, tetraallyloxyethane, and 5 to 70% by weight of styrene by the conventional emulsion polymerization processes. Examples of the conventional emulsion polymerization processes are, for instance, a polymerization in which a reactor is charged with all monomers at one time and the polymerization is carried out, a polymerization in which monomers are added dropwise, a polymerization in which monomer emulsion is added dropwise and a multistage polymerization, and the like.

As a polymerization initiator, the above-mentioned oil soluble initiator can be employed, but generally, an aqueous initiator such as potassium persulfate, ammonium persulfate or hydrogen peroxide and a combination of peroxide and reducing agent such as a redox initiator composed of ammonium persulfate and sodium hydrogensulfite are employed.

Examples of the emulsifying agents are, for instance, an anionic surfactant such as sodium lauryl sulfate, sodium dodecylbenzenesulfonate or polyoxyethylene nonylphenyl ether sulfate; a nonionic surfactant such as polyoxyethylene nonyl phenyl ether, polyoxyethylene octyl phenyl ether or a block-copolymer of polyoxyethylene and polyoxypropylene; and aqueous polymer protective colloid such as polyvinyl alcohol or hydroxyethyl cellulose; and the like.

The particle size of the emulsion polymer prepared by the above-mentioned method is from about 3 microns to about 0.02 micron. the particles having the above range are preferably employed in the present invention. Among them, fine particles having the particle size of about 0.1 to about 0.02 micron have excellent binding effect.

The process disclosed in Japanese Unexamined Patent Publication (Tokkyo-Kokai) No. 72795/1977 is employed in order to obtain the polymer emulsion having the above-mentioned fine particles. That is to say, the fine particles are prepared by adding the above-mentioned monomer mixture or monomer mixture emulsion to an aqueous solution including the anionic emulsifier with the polymerization initiator so as to carry out the emulsion polymerization wherein the final solid content of the polymer emulsion is controlled to less than 45% by weight. Also, the fine particles are obtained by preparing the polymer emulsion whereto unsaturated carboxylic acid group is intorduced to neutralize a part or all of acid group by alkali.

In case that the content of styrene in the styrene-containing copolymer is less than 5% by weight, such copolymer dissolves in alcohols and when put in methanol for agglutination, too much copolymer is lost during the process of agglutination in methanol. On the other hand, in case that the content is more than 70% by weight, the obtained polymer is so hard that the adhesion lowers and the binding effect between the pressure sensitive adhesive particles and the substrate sheet becomes poor.

The pressure sensitive adhesive sheet of the present invention is prepared by coating the dispersion of solvent-suspendable pressure sensitive adhesive particles (1) or (2) on the surface of the substrate sheet. The pressure sensitive adhesive sheet of the present invention is one that pressure sensitive adhesive particles having the particle size of about 5 to about 200 microns are densely placed on the surface of the substrate sheet such as paper, cloth, nonwoven fabric or film. Each of pressure sensitive adhesive particles is adhered to the adherend in a point, but the pressure sensitive sheet of the present invention has strong adhesion to the adherend because of a large number of particles.

When the pressure sensitive adhesive sheet is removed, so-called paper-tearing phenomenon does not occur since each of the pressure sensitive adhesive particles is adhered in a point and accordingly the adhered area of the particles is small. Therefore, the pressure sensitive adhesive sheet can be repeatedly used since pressure sensitive adhesive particles are always exposed retaining their original adhesive properties.

When the binders of styrene-containing polymer exist between pressure sensitive adhesive particles, the binders bind not only pressure sensitive adhesive particles themselves but also pressure sensitive adhesive particles to substrate sheet. Therefore, when the pressure sensitive adhesive sheet is removed from the adherend, the phenomenon such that the adhesive particles remain on the adhered (so-called adhesive migration phenomenon) does not occur.

In the pressure sensitive adhesive sheet of the present invention, the pressure sensitive adhesive particles must be densely placed on the substrate sheet. The pressure sensitive adhesive sheet can be prepared by coating the dispersion (1) or (2) in the thickness of about 2 to 30 g/m² by using a bar-coater, a roll-coater, a spray gun, a screen printing, and the like.

According to the present invention, the substrate sheet provided with the anchor coating layer is employed. As described above, the pressure sensitive adhesive sheet of the present invention can be repeatedly removed and adhered. Therefore, it is required for repeated use that the pressure sensitive adhesive particles have strong adhesion to the substrate sheet. Moreover, when the binder of the styrene-containing copolymer is employed, it is important that the pressure sensitive adhesive particles have excellent adhesion to the substrate sheet. Therefore, when the synthetic resin having poor adhesion, for instance, polyethylene, polypropylene, polyester, and the like is employed as the substrate sheet, it is effective to provide anchor coat layer on the surface of substrate sheet.

Examples of the anchor coating agents are, for instance, a thermoplastic resin such as polyurethane, melamine resin or urea resin and an imino compound or a polymer including a carboxilic acid, carboxylic anhydride or a functional group such as epoxy group, amino group or β-hydroxyl group. The anchor-coating agent is coated on the substrate sheet in the state of aqueous solution, aqueous dispersion and solvent solution. The coated layer is cured by heating. The anchor coating layer is preferably formed by coating pressure sensitive adhesive polymer such as vinyl acetate-acrylic acid ester copolymer, acrylic copolymer, natural rubber or synthetic rubber in the same manner as described above and drying the obtained coating.

The present invention is more specifically described and explained by means of the following Examples, in which all parts and % are by weight unless otherwise noted. It is to be understood that the present invention is not limited to Examples, and various changes and modifications may be made in the invention without departing from the spirit and scope thereof.

Preparation Examples 1 through 8 below show how aqueous suspensions of pressure-sensitive adhesive particles used to produce a dispersion of solvent-suspendible pressure-sensitive adhesive particles in accordance with the present invention were prepared. Preparation Examples a through e below show how aqueous suspensions for comparison purpose were prepared.

PREPARATION EXAMPLE 1

[Preparation of an Aqueous Suspension of Pressure Sensitive Adhesive Particles]

| | |
|---|---|
| Methyl methacrylate | 20 parts |
| 2-Ethylhexyl acrylate | 400 parts |
| Tetraallyloxyethane | 1.0 part |
| Maleic anhydride | 4.0 parts |
| Sodium polyacrylate (degree of polymerization: 3000 to 7000) | 16 parts |
| Water | 600 parts |
| Benzoyl peroxide | 2.0 parts |
| Sodium dodecylbenzenesulfonate | 20 parts |

The polymerization was carried out by employing the above components to give an aqueous suspension of pressure sensitive adhesive particles which included particles having a particle size of 80 to 100 microns in an amount of at least 80%.

PREPARATION EXAMPLE 2

[Preparation of an Aqueous Suspension of Pressure Sensitive Adhesive Particles]

| | |
|---|---|
| Styrene | 12 parts |
| Butyl acrylate | 390 parts |
| Triallyl isocyanurate | 1.0 part |
| Maleic anhydride | 5 parts |
| Hydroxyethyl cellulose | 20 parts |
| Water | 600 parts |
| Benzoyl peroxide | 2.0 parts |
| Sodium dodecylbenzenesulfonate | 20 parts |

The polymeriaztion was carried out by employing the above components to give an aqueous suspension of pressure sensitive adhesive particles which included particles having a particle size of 15 to 50 microns in an amount of at least 80%.

PREPARATION EXAMPLE 3

[Preparation of an Aqueous Suspension of Pressure Sensitive Adhesive Particles]

| | |
|---|---|
| Methyl methacrylate | 32 parts |
| Isononyl acrylate | 400 parts |
| Triallyl cyanurate | 3.7 parts |
| Maleic anhydride | 1.5 parts |
| Polyvinyl alcohol | 15 parts |
| Water | 600 parts |
| Benzoyl peroxide | 2.0 parts |
| Sodium dodecylbenzenesulfonate | 20 parts |

The polymerization was carried out by employing the above components to give an aqueous suspension of pressure sensitive adhesive particles which included particles having a particle size of 45 to 70 microns in an amount of at least 80%.

PREPARATION EXAMPLE 4

[Preparation of an Aqueous Suspension of Pressure Sensitive Adhesive Particles]

| | |
|---|---|
| Methyl methacrylate | 32 parts |
| Isononyl acrylate | 400 parts |
| Tetraallyloxyethane | 2 parts |
| Maleic anhydride | 1.5 parts |
| Polyvinyl alcohol | 15 parts |
| Water | 600 parts |

| | |
|---|---|
| Benzoyl peroxide | 2.0 parts |
| Sodium dodecylbenzenesulfonate | 20 parts |

The polymerization was carried out by empolying the above components to give an aqueous suspension of pressure sensitive adhesive particles which included particles having a particle size of 35 to 60 microns in an amount of at least 80%.

PREPARATION EXAMPLE 5

[Preparation of an Aqueous Suspension of Pressure Sensitive Adhesive Particles]

| | |
|---|---|
| Methyl methacrylate | 15 parts |
| 2-ethylhexyl acrylate | 405 parts |
| Triallyl isocyanurate | 1.0 part |
| Maleic anhydride | 4.0 parts |
| Sodium polyacrylate (degree of polymerization: 3000 to 7000) | 16 parts |
| Azobis isobutyronitrile | 2.0 parts |
| Sodium dodecylbenzenesulfonate | 20 parts |

The polymerization was carried out by employing the above components to give an aqueous suspension of particles sensitive adhesive particles which included particles having a particle size of 80 to 100 microns in an amount of at least 80%.

PREPARATION EXAMPLE 6

[Preparation of an Aqueous Suspension of Pressure Sensitive Adhesive Particles]

| | |
|---|---|
| Styrene | 12 parts |
| Butyl acrylate | 190 parts |
| 2-ethylhexyl acrylate | 200 parts |
| Tetraallyloxyethane | 1 part |
| Maleic anhydride | 5 parts |
| Hydroxyethyl cellulose | 20 parts |
| Water | 600 parts |
| Benzoyl peroxide | 2.0 parts |
| Sodium dodecylbenzenesulfonate | 20 parts |

The polymerization was carried out by employing the above components to give an aqueous suspension of pressure sensitive adhesive particles which included particles having a particle size of 15 to 50 microns in an amount of at least 80%.

PREPARATION EXAMPLE 7

[Preparation of an Aqueous Suspension of Pressure Sensitive Adhesive Particles]

| | |
|---|---|
| Methyl methacrylate | 32 parts |
| Isononyl acrylate | 400 parts |
| Triallyl isocyanurate | 3.7 parts |
| Maleic anhydride | 1.5 parts |
| Hydroxyethyl cellulose | 15 parts |
| Water | 600 parts |
| Benzoyl peroxide | 2.0 parts |
| Sodium dodecylbenzenesulfonate | 15 parts |
| 70% aqueous solution of dialkyl sodium sulfosuccinate | 7 parts |

The polymerization was carried out by employing the above components to give an aqueous suspension of pressure sensitive adhesive particles which included particles having a particle size of 45 to 70 microns in an amount of at least 80%.

PREPARATION EXAMPLE 8

[Preparation of an Aqueous Suspension of Pressure Sensitive Adhesive Particles]

| | |
|---|---|
| Methyl methacrylate | 32 parts |
| Isononyl acrylate | 400 parts |
| Tetraallyloxyethane | 2 parts |
| Maleic anhydride | 1.5 parts |
| Polyvinyl alcohol | 15 parts |
| Water | 600 parts |
| Benzoyl peroxide | 2.0 parts |
| Sodium dodecylbenzenesulfonate | 20 parts |

The polymerization was carried out by employing the above components to give an aqueous suspension of pressure sensitive adhesive particles which included particles having a particle size of 35 to 60 microns in an amount of at least 80%.

PREPARATION EXAMPLE 9

[Preparation of an Emulsion of Styrene-containing Polymer]

| | |
|---|---|
| Styrene | 200 parts |
| 2-Ethylhexyl acrylate | 134 parts |
| Acrylic acid | 10 parts |
| Polyoxyethylene nonylphenyl ether sulfate (30% aq.) | 5 parts |
| Polyoxyethylene nonylphenyl ether (EO content: 10 to 20% by mole) | 5 parts |
| Water | 670 parts |
| Ammonium persulfate | 2 parts |

The polymerization was carried out by employing the above components and the resultant was adjusted to pH8 to 9 to give an emulsion having an average particle size of 0.9 micron.

PREPARATION EXAMPLE 10

[Preparation of an Emulsion of Styrene-containing Polymer]

| | |
|---|---|
| Styrene | 200 parts |
| Butyl acrylate | 134 parts |
| Acrylamide | 4.5 parts |
| Methacrylic acid | 12 parts |
| Sodium sec-alkane sulfonate ($C_{12}$ to $C_{16}$) | 18 parts |
| Polyoxyethylene nonylphenyl ether (EO content: 10 to 12% by mole) | 7 parts |
| Water | 670 parts |
| Potassium persulfate | 2 parts |

The polymerization was carried out by employing the above components and the resultant was adjusted to pH8 to 9 to give an emulsion having an average particle size of 0.036 micron.

PREPARATION EXAMPLE 11

[Preparation of an Emulsion of Styrene-containing Polymer]

| | |
|---|---|
| Styrene | 23.2 parts |
| Ethyl acrylate | 207.0 parts |
| 2-Hydroxyethyl acrylate | 14 parts |
| Acrylonitrile | 14 parts |
| Methacrylic acid | 21 parts |
| Trichlorobromomethane | 2.8 parts |
| Water | 301.5 parts |

| Sodium lauryl sulfate | 3.3 parts |
|---|---|
| Ammonium persulfate | 1.5 parts |

The polymerization was carried out by employing the above components to give an emulsion. To the obtained emulsion were added 245 parts of water and 114 parts of 5.6%-aqueous ammonia, and the mixture was aged for 1 hour to give an emulsion having an average particle size of 0.069 micron.

PREPARATION EXAMPLE A

[Preparation of an Aqueous Suspension of Pressure Sensitive Adhesive Particles for Comparison]

The procedure of Preparation Example 1 was repeated except that tetraallyloxyethane was not employed to give an aqueous suspension of pressure sensitive adhesive particles which included particles having a particle size of 80 to 100 microns in an amount of at least 80%.

PREPARATION EXAMPLE B

[Preparation of an Aqueous Suspension of Pressure Sensitive Adhesive Particles for Comparison]

The procedure of Preparation Example 1 was repeated except that tetraallyloxyethane was employed in an amount of 6.5 parts (1.5% to all monomer components) instead of 1.0 part to give an aqueous suspension of pressure sensitive adhesive particles which included particles having a particle size of 80 to 100 microns in an amount of at least 80%.

PREPARATION EXAMPLE C

[Preparation of an Aqueous Suspension of Pressure Sensitive Adhesive Particles for Comparison]

The procedure of Preparation Example 2 was repeated except that 2.0 parts of divinylbenzene was employed instead of 1.0 part of triallylisocyanurate to give an aqueous suspension of pressure sensitive adhesive particles having a particle size of 15 to 50 microns in an amount of at least 80%.

PREPARATION EXAMPLE D

[Preparation of an Aqueous Suspension of Pressure Sensitive Adhesive Particles for Comparison]

The procedure of Preparation Example 3 was repeated except that triallyl cyanurate was employed in an amount of 6 parts (1.4% to all monomer components) instead of 3.7 parts to give an aqueous suspension of pressure sensitive adhesive particles having a particle size of 45 to 70 microns in an amount of at least 80%.

PREPARATION EXAMPLE E

The procedure of Preparation Example 4 was repeated except that maleic anhydride was not employed. A desired suspension could not be obtained since too many aggregate were prepared in the course of the polymerization.

PREPARATION EXAMPLE F

[Preparation of an Emulsion of Styrene-containing Polymer for Comparison]

| Styrene | 268 parts |
|---|---|
| Butyl acrylate | 66 parts |
| Acrylamide | 4.5 parts |
| Methacrylic acid | 12 parts |
| Sodium sec-alkane sulfonate ($C_{12}$ to $C_{16}$) | 18 parts |
| Polyoxyethylene nonylphenyl ether (EO content: 10 to 12% by mole) | 7 parts |
| Water | 670 parts |
| Potassium persulfate | 2 parts |

The polymerization was carried out by employing the above components and the resultant was adjusted to pH 8 to 9 to give an emulsion having an average particle size of 0.04 micron and a styrene content of 76.4%.

PREPARATION EXAMPLE G

[Preparation of an Emulsion of Polyacrylic Ester for Comparison]

| Methyl methacrylate | 200 parts |
|---|---|
| 2-Ethylhexyl acrylate | 134 parts |
| Acrylic acid | 10 parts |
| Polyoxyethylene nonylphenyl ether sulfate (30% aq.) | 5 parts |
| Polyoxyethylene nonylphenyl ether (EO content: 10 to 12% by mole) | 5 parts |
| Water | 670 parts |
| Ammonium persulfate | 2 parts |

The polymerization was carried out by employing the above components and the resultant was adjusted to pH 8 to 9 to give an emulsion of acrylic polymer having an average particle size of 0.33 micron.

PREPARATION EXAMPLE H

[Preparation of an Emulsion of Polyacrylic Ester for Comparison]

| Methyl methacrylate | 200 parts |
|---|---|
| Butyl acrylate | 134 parts |
| Acrylamide | 4.5 parts |
| Methacrylic acid | 12 parts |
| Sodium sec-alkane sulfonate ($C_{12}$ to $C_{16}$) | 18 parts |
| Polyoxyethylene nonylphenyl ether (EO content: 10 to 12% by mole) | 7 parts |
| Water | 670 parts |
| Potassium persulfate | 2 parts |

The polymerization was carried out by employing the above components and the resultant was adjusted to pH 8 to 9 to give an emulsion of acrylic polymer having an average particle size of 0.04 micron.

Pressure-sensitive adhesive particles obtained by polymerizing the specific internally-crosslinking monomers in the desired amount were used to produce adhesive sheets (Examples 1-4) in accordance with the present invention and adhesive sheets for comparison purpose (Comparative Examples 1-4).

EXAMPLE 1

The aqueous suspension of the pressure sensitive adhesive particles obtained in Preparation Example 1 was added to methanol to coagulate. After the coagulum was washed, the obtained bulk-polymer was dispersed into various organic solvents shown in Table 1 to give a dispersion of solvent-suspendible pressure sensitive adhesive particles having a concentration of about 25%.

Then, a 50% methanol solution of acrylic acid ester/vinyl acetate copolymer (commercially available under the commercial name "Corponyl 4081", made by Nippon Gohsei Kagaku Kogyo Kabushiki Kaisha) was coated in an amount of about 1.5 g/m² on a wood free paper (55 K) ("55 K" is a unit of thickness of a paper and is about 66 g/m²) as an anchor coat and was dried to give a substrate sheet. Then the above-mentioned dispersion was coated in an amount of about 20 g/m² (as solid matter) on the substrate sheet coated with anchor coat and was dried by hot air at 40° C. for 30 minutes to give a pressure sensitive adhesive sheet which did not curl.

EXAMPLE 2

The procedure of Example 1 was repeated except that the aqueous suspension obtained in Preparation Example 2 was employed instead of the suspension obtained in Preparation Example 1 to give a dispersion of solvent-suspendible pressure sensitive adhesive particles.

Then the obtained dispersion was coated in an amount of about 5 g/m² (as solid matter) on a wood free paper (55 K) and was dried by hot air at 40° C. for 30 minutes to give a pressure sensitive adhesive sheet which did not curl.

EXAMPLE 3

The procedure of Example 1 was repeated except that the aqueous suspension obtained in Preparation Example 3 was employed instead of the suspension obtained in Preparation Example 1 to give a dispersion of solvent-suspendible pressure sensitive adhesive particles.

Then, the obtained dispersion was coated in an amount of 10 g/m² (as solid matter) on a substrate sheet prepared by the same mannner as in Example 1 and was dried by hot air at 40° C. for 30 minutes to give a pressure sensitive adhesive sheet which did not curl.

Example 4

The procedure of Example 1 was repeated except that the aqueous suspension obtained in Preparation Example 4 was employed instead of the suspension obtained in Preparation Example 1 to give a dispersion of solvent-suspendible pressure sensitive adhesive particles.

Then, the obtained dispersion was coated in an amount of 15 g/m² (as solid matter) on a substrate sheet prepared by the same manner as in Example 1 and was dried by hot air at 40° C. for 30 minutes to give a pressure sensitive adhesive sheet which did not curl.

COMPARATIVE EXAMPLE 1

The procedure of Example 1 was repeated except that the aqueous suspension obtained in Preparation Example a was employed instead of the suspension obtained in Preparation Example 1 to give a dispersion of solvent-suspendible particles.

Then, procedure of Example 1 was repeated except that the above dispersion was employed to give a sheet coated with particles.

COMPARATIVE EXAMPLE 2

The procedure of Example 1 was repeated except that the aqueous suspension obtained in Preparation Example b was employed instead of the suspension obtained in Preparation Example 1 to give a dispersion of solvent-suspendible particles.

Then, the obtained dispersion was coated on a substrate sheet coated with anchor coating agent in the same manner as in Example 1 to give a sheet coated with particles.

COMPARATIVE EXAMPLE 3

The procedure of Example 2 was repeated except that the suspension obtained in Preparation Example c was employed instead of the suspension obtained in Preparation Example 2 to give a dispersion of solvent-suspendible particles.

Then, the obtained dispersion was coated on a wood free paper (55 K) in the same manner as in Example 2 to give a sheet coated with particles.

COMPARATIVE EXAMPLE 4

The procedure of Example 1 was repeated except that the suspension obtained in Preparation Example d was employed instead of the suspension obtained in Preparation Example 1 to give a dispersion of solvent-suspendible particles.

Then, the obtained dispersion was coated on a substrate sheet coated with anchor coat in the same manner as in Example 1.

TEST EXAMPLE 1

Examples 1-4, dispersions of solvent-suspendible pressure-sensitive adhesive particles in accordance with the present invention and Comparative Examples 1-4, dispersions of solvent-suspendible pressure-sensitive adhesive particles prepared for comparison purpose, were checked for the swelling of suspended particles therein.

A degree of swelling of the suspended particles was measured according to the following method.

[Degree of Swelling]

The above-mentioned dispersion of particles is coated in an amount of about 30 g/m² on a polyester film having a thickness of 38 microns. A particle size ($P_1$) is measured just after coating and a particle size ($P_2$) allowed to stand for 30 minute at ordinary temperature is measured, provided that the particle sizes are measured with microphotographs.

$$\text{Degree of swelling} = \frac{\text{A particle size } (P_1)}{\text{A particle size } (P_2)}$$

The result are shown in Table 1.

Examples 1-4, pressure-sensitive adhesive sheets, and Comparison Examples 1-4, sheets coated with particles, were put on a test of repeated adhering and removing.

The number of repeated operation of adhering and removing of the above-mentioned sheet was measured according to the following method.

[Number of Repeated Operation of Adhering and Removing]

The operation of adhering and removing of the above-mentioned sheet was repeated on a newspaper until the sheet loses adhesion thereof:

The numbers of the repeated operation of adhering and removing are shown in Table 1.

[Paper-tearing Phenomenon]

It is observed that the picking of newspapers occurs or not when the above-mentioned sheet loses its adhesion to newspapers.

The results are shown in Table 1.

TABLE 1

|  | Kind of organic solvent | Degree of swelling | Number of repeated operation adhering and removing (times) |
|---|---|---|---|
| Ex. 1 | Ethyl acetate | 2.0 | >40 |
|  | Toluene | 1.8 | >40 |
|  | 1,1,1-Trichloroethane | 1.8 | >40 |
| Ex. 2 | Ethyl acetate | 1.8 | >40 |
|  | Toluene | 1.9 | >40 |
|  | 1,1,1-Trichloroethane | 2.0 | >40 |
| Ex. 3 | Ethyl acetate | 2.0 | >40 |
|  | Toluene | 2.0 | >40 |
|  | 1,1,1-Trichloroethane | 2.0 | >40 |
| Ex. 4 | Ethyl acetate | 2.1 | >40 |
|  | Toluene | 1.9 | >40 |
|  | 1,1,1-Trichloroethane | 1.9 | >40 |

|  | Kind of organic solvent | Degree of swelling | Number of repeated operation of adhering and removing (times) | Adhesive properties |
|---|---|---|---|---|
| Com. Ex. 1 | Ethyl acetate | 0.7 | 5 | Paper-tearing phenomenon was observed. |
|  | Toluene | not more than 0.7 | 2 | Paper-tearing phenomenon was observed. |
|  | 1,1,1-Trichloroethane | not more than 0.7 | 2 | Paper-tearing phenomenon was observed. |
| Com. Ex. 2 | Ethyl acetate | 2.2 | — | Poor adhesion |
|  | Toluene | 2.1 | — | Poor adhesion |
|  | 1,1,1-Trichloroethane | 2.1 | — | Poor adhesion |
| Com. Ex. 3 | Ethyl acetate | 1.1 | 8 | Paper-tearing phenomenon was observed. |
|  | Toluene | 0.9 | 3 | Paper-tearing phenomenon was observed. |
|  | 1,1,1-Trichloroethane | not more than 0.7 | 1 | Paper-tearing phenomenon was observed. |
| Com. Ex. 4 | Ethyl acetate | 1.9 | — | Poor adhesion |
|  | Toluene | 2.1 | — | Poor adhesion |
|  | 1,1,1-Trichloroethane | 1.7 | — | Poor adhesion |

From the results of Table 1, it is confirmed that the pressure sensitive adhesive particles of the present invention are normal in the degree of swelling (from 1.8 to 2.1).

The good pressure sensitive adhesive particles swell about twice in diameter in a solvent (about 8 times in volume) compared with their original size. The diameter returns to their original conditions by evaporating solvent while the particles were maintained spherical. That is, in that case, a degree of swelling is about 2.

The poor adhesive particles, however, lose their roud shape or flow when they are placed on the substrate so that after the evaporation of solvent, their diameters (seen from the top) become larger than half the original diameters or at times larger than the original diameters.

In that case, the particles cannot adhered in a point and whereby the paper-tearing phenomenon occurs. Also, the number of the repeated operation of adhering and removing decreases.

In the pressure sensitive adhesive sheet of the present invention, not less than 40 times of the repeated operation of adhering and removing can be obtained.

The following are Examples and Comparative Examples in which the binder is added.

EXAMPLES 5 TO 12

The dispersion obtained in Preparation Examples 5 to 8 was mixed with the binders obtained in Preparation Examples 9 to 11 in the proportions shown in Table 2 and the mixture was introduced into methanol to coagulate. After the obtained coagulum was washed, the bulk-polymer was taken out and it was added to toluene as a solvent and dispersed by stirring to give a dispersion of solvent-suspendible pressure sensitive adhesive particles having a concentraion of about 25%.

Then, the obtained disperion was cotated on a wood free paper (55 K) in a dry weight of 7 to 9 g/m$^2$ by employing a desk-coater. The cotated paper was dried at 40° C. for 1 minute to give a pressur sensitive adhesive sheet.

COMPARATIVE EXAMPLES 5 TO 10

The procedure of Example 5 was repeated except that the disperion obtained in Preparation Examples 5 to 8 was mixed with the binders obtained in Comparative Preparation Examples f to h in the proportion shown in Table 2 to give a sheet coated with particles.

EXAMPLE 13

As an anchor coat, Corponyl 4081 was coated on a wood free paper (55 K) in an amount of 1.5 g/m$^2$ and dried to give a substrate sheet.

The dispersion of solvent-suspendible pressure sensitive adhesive particles prepared in Example 5 having a concentration of about 25% was coated on the obtained substrate sheet coated with anchor coating agent in a dry weight of 7 to 9 g/m² by employeing a desk-coater and was dried by hot air at 40° C. for 1 minute to give a pressure sensitive adhesive sheet.

TEST EXAMPLE 2

With respect to the pressure sensitive adhesive sheet and the sheet, coated with particles obtained in Examples 5 to 13 and Comparative Examples 5 to 10, an adhesive migration, degree of swelling, number of the repeated operation of adhering and removing of the sheet, paper-picking and pressure sensitive adhesive properties (adhesion, tack) were measured. A degree of swelling, number of the repeated operation of adhering and removing of the sheet and paper-picking were measured in the same manner as in Test Example 1. The adhesive transfer, adhesion and tack were measured as follow:

[Test for Adhesive Migration]

The test plate of the sheet coated on the back with the commercially available plastic film sheet (width: 20 mm, length: 100 mm) is laminated to a commercially available mirror-coated paper coated on the back with the stainless plate.

After adhering the test plate to the cast-coated paper for 2 hours by employing the rubber roller provided in JIS Z 0237 (weight: 2 kg), the test plate is removed from the cast-coated paper at a speed of 30 m/minute. The weight of the particles transfered to cast-coated paper is measured and the adhesive transfer is shown as a paercentage of the above weight to the first weight of the particles placed on the test panel. The test was repeated 3 times and the result was evaluated by the avarage.

[Adhesion] (g/25 mm)

The adhesion is measured according to JIS Z 0237.

[Tack] (Ball Number)

The tack is measured according to JIS Z 0237. The results are shown in Table 3.

TABLE 2

|  | Dispersion of pressure sensitive adhesive particles |  | Emulsion for binder |  |
| --- | --- | --- | --- | --- |
| Ex. 5 | Dispersion prepared in Pre. Ex. 5 | 100 parts | Emulsion prepared in Pre. Ex. 9 (st cont.) | 5 parts |
| Ex. 6 | Dispersion prepared in Pre. Ex. 6 | 100 parts | Emulsion prepared in Pre. Ex. 10 (st cont.) | 10 parts |
| Ex. 7 | Dispersion prepared in Pre. Ex. 7 | 100 parts | Emulsion prepared in Pre. Ex. 11 (st cont.) | 15 parts |
| Ex. 8 | Dispersion prepared in Pre. Ex. 8 | 100 parts | Emulsion prepared in Pre. Ex. 9 (st cont.) | 15 parts |
| Ex. 9 | Dispersion prepared in Pre. Ex. 5 | 100 parts | Emulsion prepared in Pre. Ex. 10 (st cont.) | 10 parts |
| Ex. 10 | Dispersion prepared in Pre. Ex. 6 | 100 parts | Emulsion prepared in Pre. Ex. 11 (st cont.) | 5 parts |
| Ex. 11 | Dispersion prepared in Pre. Ex. 7 | 100 parts | Emulsion prepared in Pre. Ex. 10 (st cont.) | 5 parts |
| Ex. 12 | Dispersion prepared in Pre. Ex. 8 | 100 parts | Emulsion prepared in Pre. Ex. 11 (st cont.) | 10 parts |
| Ex. 13 | Dispersion prepared in Pre. Ex. 5 | 100 parts | Emulsion prepared in Pre. Ex. 9 (st cont.) | 5 parts |
| Com. Ex. 5 | Dispersion prepared in Pre. Ex. 5 | 100 parts | Emulsion prepared in Pre. Ex. f (st high cont.) | 10 parts |
| Com. Ex. 6 | Dispersion prepared in Pre. Ex. 6 | 100 parts | Emulsion prepared in Pre. Ex. g (Acryl Em) | 10 parts |
| Com. Ex. 7 | Dispersion prepared in Pre. Ex. 7 | 100 parts | Emulsion prepared in Pre. Ex. h (Acryl Em) | 10 parts |
| Com. Ex. 8 | Dispersion prepared in Pre. Ex. 8 | 100 parts | Emulsion prepared in Pre. Ex. 10 (st cont.) | 30 parts |
| Com. Ex. 9 | Dispersion prepared in Pre. Ex. 5 | 100 parts | Emulsion prepared in Pre. Ex. 10 (st cont.) | 0.5 parts |
| Com. Ex. 10 | Dispersion prepared in Pre. Ex. 5 | 100 parts | — | — |

TABLE 3

|  | Adhesive transfer (%) | Degree of swelling | Number of repeated operation of adhering and removing (times) | Paper-tearing | Adhesion (g/25 mm) | Tack (ball number) |
| --- | --- | --- | --- | --- | --- | --- |
| Ex. 5 | 4 | 2.1 | >40 | No | 105 | 5 |
| Ex. 6 | <1 | 2.0 | >40 | No | 100 | 6 |
| Ex. 7 | 2 | 1.8 | >40 | No | 91 | 5 |
| Ex. 8 | <1 | 2.2 | >40 | No | 87 | 5 |
| Ex. 9 | <1 | 2.1 | >40 | No | 110 | 6 |
| Ex. 10 | 3 | 1.8 | >40 | No | 96 | 5 |
| Ex. 11 | <1 | 1.8 | >40 | No | 105 | 6 |
| Ex. 12 | 2 | 2.3 | >40 | No | 92 | 5 |
| Ex. 13 | <1 | 1.8 | >40 | No | 98 | 5 |
| Com. Ex. 5 | <1 | 2.1 | 32 | No | 63 | 3 |
| Com. Ex. 6 | 85 | 2.2 | >40 | No | 90 | 6 |
| Com. Ex. 7 | 98 | 2.2 | >40 | No | 97 | 6 |
| Com. Ex. 8 | <1 | 1.7 | 5 | No | 16 | 2 |
| Com. Ex. 9 | 65 | 2.2 | >40 | No | 113 | 6 |

TABLE 3-continued

| | Adhesive transfer (%) | Degree of swelling | Number of repeated operation of adhering and removing (times) | Paper-tearing | Adhesion (g/25 mm) | Tack (ball number) |
|---|---|---|---|---|---|---|
| Com. Ex. 10 | 98 | 2.0 | >40 | No | 120 | 6 |

From the results in Table 3, it is confirmed that the pressure sensitive adhesive particles including binder of the present invention are normal in the degree of swelling (from 1.8 to 2.3). In Comparative Examples, the degree of swelling is normal (from 1.7 to 2.2) because of employing the specific internal cross-linking agent. Therefore, in Examples and Comparative Examples, the paper-tearing phenomenon does not occur.

In Examples, the adhesive migration phenomenon hardly occurs and not less than 40 times of the number of the repeated operation of adhering and removing can be obtained. Moreover, the pressure sensitive adhesive sheet of the invention has a suitable value (from 87 to 110 g/25 mm) in adhesion and a suitable value (from 5 to 6) in tack (ball number).

In Comparative Examples 5 and 8, the adhesive migration, degree of swelling and paper-tearing are excellent, but the adhesion lowers and the number of the repeated operation of adhering and removing and tack show low value since in Comparative Example 5 the emulsion of polymer including a large amount of styrene content is added as a binder and in Comparative Example 8 the emulsion of styrene-containing polymer is added in a large amount.

In Comparative Examples 6 and 7, the binders are dissolved in methanol and losed on intorducing into methanol to coagulate since the acrylic emulsion is employed as a binder. Therefore, the adhesive migration phenomenon remarkably occurs as in the case that the emulsion of styrene-containing polymer is employed in a small amount (Comparative Example 9) and the case that the binder is not employed (Comparative Example 10).

What we claim is:

1. A dispersion of solvent-suspendible pressure sensitive adhesive particles, which comprises (A) pressure sensitive adhesive particles comprising an internally cross-linked copolymer and having a particle size of 5 to 200 microns and
   an organic solvent;
   said internally cross-linked copolymer being prepraed by copolymerizing
   (a) 2 to 10% by weight of at least one member selected from the group consisting of methyl acrylate, styrene and a methacrylate of alcohol having 1 to 5 carbon atoms,
   (b) 98 to 90% by weight of at least one member selected from the group consisting of an acrylate of alcohol having 2 to 12 carbon atoms and a methacrylate of alcohol having 6 to 12 carbon atoms,
   (c) 0.1 to 2.0% by weight of maleic anhydride, and
   (d) 0.05 to 1.0% by weight of at least one member selected from the group consisting of tetraallyloxyethane, triallyl cyanurate and triallyl isocyanurate.

2. A pressure sensitive adhesive sheet prepared by coating a sheet with a dispersion of solvent-suspendible pressure sensitive adhesive particles, which comprises
   (A) pressure sensitive adhesive particles comprising an internally cross-linked copolymer and having a particle size of 5 to 200 microns and
   an organic solvent;
   said internally cross-linked copolymer being prepared by copolymerizing
   (a) 2 to 10% by weight of at least one member selected from the group consisting of methyl acrylate, styrene and a methacrylate of alcohol having 1 to 5 carbon atoms,
   (b) 98 to 90% by weight of at least one member selected from the group consisting of an acrylate of alcohol having 2 to 12 carbon atoms and a methacrylate of alcohol having 6 to 12 carbon atoms,
   (c) 0.1 to 2.0% by weight of maleic anhydride, and
   (d) 0.05 to 1.0% by weight of at least one member selected from the group consisting of tetraallyloxyethane, triallyl cyanurate and triallyl isocyanurate.

3. The pressure sensitive adhesive sheet of claim 2, wherein said substrate sheet has an anchor coating layer placed on a surface thereof.

4. A dispersion of solvent-suspendible pressure sensitive adhesive particles, which comprises
   (A) 100 parts by weight of pressure sensitive adhesive particles comprising an internally cross-linked copolymer and having a particle size of 5 to 200 microns,
   (B) 2 to 20 parts by weight (as solid matter) of a binder for said pressure sensitive adhesive particles which is a styrene-containing polymer having a styrene content of 5 to 70% by weight and having a particle size of 0.02 to 3 microns,
   and an organic solvent; said internally cross-linked copolymer being prepared by copolymerizing
   (a) 2 to 10% by weight of at least one member selected from the group consisting of methyl acrylate, styrene and a methacrylate of alcohol having 1 to 5 carbon atoms,
   (b) 98 to 90% by weight of at least one member selected from the group consisting of an acrylate of alcohol having 2 to 12 carbon atoms and a methacrylate of alcohol having 6 to 12 carbon atoms,
   (c) 0.1 to 2.0% by weight of maleic anhydride, and
   (d) 0.05 to 1.0% by weight of at least one member selected from the group consisting of tetraallyloxyethane, triallyl cyanurate and triallyl isocyanurate.

5. A pressure sensitive adhesive sheet prepared by coating a sheet with a dispersion of solvent-suspendible pressure sensitive adhesive particles, which comprises
   (A) 100 parts by weight of pressure sensitive adhesive particles comprising an internally cross-linked copolymer and having a particle size of 5 to 200 microns,
   (B) 2 to 20 parts by weight (as solid matter) of a binder for said pressure sensitive aprticles which is a styrene-containing polymer having a styrene content of 5 to 70% by weight and having a particle size of 0.02 to 3 microns,
   and an organic solvent; said internally cross-linked copolymer being prepared by copolymerizing
   (a) 2 to 10% by weight of at least one member selected from the group consisting of methyl acrylate, styrene and a methacrylate of alcohol having 1 to 5 carbon atoms,
(b) 98 to 90% by weight of at least one member selected from the group consisting of an acrylate of alcohol having 2 to 12 carbon atoms and a methacrylate of alcohol having 6 to 12 carbon atoms,
(c) 0.1 to 2.0% by weight of maleic anhydride, and
(d) 0.05 to 1.0% by weight of at least one member selected from the group consisting of tetraallyloxyethane, triallyl cyanurate and triallyl isocyanurate.

6. The pressure sensitive adhesive sheet of claim 5, wherein said substrate sheet has an anchor coating layer placed on a surface thereof.

* * * * *